(12) United States Patent
Crowley et al.

(10) Patent No.: US 8,103,785 B2
(45) Date of Patent: Jan. 24, 2012

(54) NETWORK ACCELERATION TECHNIQUES

(75) Inventors: Patricia Crowley, Spokane, WA (US); James Michael Awrach, Peabody, MA (US); Arthur Barney Maccabe, Knoxville, TN (US)

(73) Assignee: SeaFire Micros, Inc., Beverly, MA (US)

( * ) Notice: Subject to any disclaimer, the term of this patent is extended or adjusted under 35 U.S.C. 154(b) by 259 days.

(21) Appl. No.: 12/327,438

(22) Filed: Dec. 3, 2008

(65) Prior Publication Data
US 2009/0168799 A1 Jul. 2, 2009

Related U.S. Application Data

(60) Provisional application No. 61/004,955, filed on Dec. 3, 2007, provisional application No. 61/063,843, filed on Feb. 7, 2008.

(51) Int. Cl.
*G06F 15/16* (2006.01)
*G06F 15/167* (2006.01)

(52) U.S. Cl. .................... 709/230; 709/213; 709/250

(58) Field of Classification Search ............. 709/213, 709/227, 228, 230, 200, 250; 370/252, 469
See application file for complete search history.

(56) References Cited

U.S. PATENT DOCUMENTS

| | | | |
|---|---|---|---|
| 6,795,534 B2* | 9/2004 | Noguchi | 379/88.17 |
| 6,996,070 B2* | 2/2006 | Starr et al. | 370/252 |
| 7,299,266 B2* | 11/2007 | Boyd et al. | 709/213 |
| 7,519,650 B2* | 4/2009 | Boyd et al. | 709/200 |
| 7,586,936 B2* | 9/2009 | Arimilli et al. | 370/463 |
| 7,596,634 B2* | 9/2009 | Mittal et al. | 709/250 |
| 7,613,813 B2* | 11/2009 | Hussain et al. | 709/227 |
| 7,668,165 B2* | 2/2010 | Hoskote et al. | 370/392 |
| 7,783,769 B2* | 8/2010 | Vasudevan et al. | 709/230 |
| 7,818,362 B2* | 10/2010 | Boyd et al. | 709/200 |
| 7,912,988 B2* | 3/2011 | Boyd et al. | 709/250 |
| 2002/0161907 A1* | 10/2002 | Moon | 709/230 |
| 2004/0010674 A1* | 1/2004 | Boyd et al. | 711/170 |
| 2004/0042487 A1 | 3/2004 | Ossman | |
| 2005/0015502 A1* | 1/2005 | Kang et al. | 709/228 |
| 2005/0060414 A1* | 3/2005 | Phillips et al. | 709/227 |
| 2005/0122986 A1* | 6/2005 | Starr et al. | 370/412 |
| 2006/0168281 A1* | 7/2006 | Starr et al. | 709/230 |
| 2006/0251120 A1* | 11/2006 | Arimilli et al. | 370/469 |
| 2007/0162639 A1* | 7/2007 | Chu et al. | 710/22 |
| 2008/0159295 A1* | 7/2008 | Lee et al. | 370/394 |

OTHER PUBLICATIONS

M. Welsh, et al., "Incorporating Memory Managment into User-Level Netowrk Interfaces," 1997, Cornell University.*

* cited by examiner

*Primary Examiner* — Saleh Najjar
*Assistant Examiner* — Tae Kim
(74) *Attorney, Agent, or Firm* — McDermott Will & Emery LLP

(57) ABSTRACT

Splintered offloading techniques with receive batch processing are described for network acceleration. Such techniques offload specific functionality to a NIC while maintaining the bulk of the protocol processing in the host operating system ("OS"). The resulting protocol implementation allows the application to bypass the protocol processing of the received data. Such can be accomplished this by moving data from the NIC directly to the application through direct memory access ("DMA") and batch processing the receive headers in the host OS when the host OS is interrupted to perform other work. Batch processing receive headers allows the data path to be separated from the control path. Unlike operating system bypass, however, the operating system still fully manages the network resource and has relevant feedback about traffic and flows. Embodiments of the present disclosure can therefore address the challenges of networks with extreme bandwidth delay products (BWDP).

38 Claims, 10 Drawing Sheets

NETWORK ACCELERATION TECHNIQUES

RELATED APPLICATIONS

This application claims the benefit of U.S. Provisional Patent Application Ser. No. 61/004,955, entitled "10-100 Gbps offload NIC for WAN, NLR, Grid computing" filed 3 Dec. 2007, and also claims the benefit of U.S. Provisional Patent Application Ser. No. 61/063,843, entitled "Splintered TCP offload engine for grid computing and BDWP" filed 7 Feb. 2008; the entire contents of both of which applications are incorporated herein by reference.

FEDERALLY SPONSORED RESEARCH OR DEVELOPMENT

This invention was made with government support by (i) the National Aeronautics and Space Administration (NASA), under contract No. SBIR 06-1-S8.05-8900, and (ii) the National Science Foundation, under contract No. STTR Grant IIP-0637280. The Government has certain rights in the invention.

BACKGROUND

The rapid growth of computer networks in the past decade has brought, in addition to well known advantages, dislocations and bottlenecks in utilizing conventional network devices. For example, a CPU of a computer connected to a network may spend an increasing proportion of its time processing network communications, leaving less time available for other work. In particular, file data exchanges between the network and a storage unit of the computer, such as a disk drive, are performed by dividing the data into packets for transportation over the network. Each packet is encapsulated in layers of control information that are processed one layer at a time by the receiving computer CPU.

Although the speed of CPUs has constantly increased, this type of protocol processing can consume most of the available processing power of the fastest commercially available CPU. A rough estimation indicates that in a Transmission Control Protocol (TCP)/Internet Protocol (IP) network, one currently needs one hertz of CPU processing speed to process one bit per second of network data. Furthermore, evolving technologies such as IP storage, streaming video and audio, online content, virtual private networks (VPN) and e-commerce, require data security and privacy like IP Security (IPSec), Secure Sockets Layer (SSL) and Transport Layer Security (TLS) that increase even more the computing demands from the CPU. Thus, the network traffic bottleneck has shifted from the physical network to the host CPU.

Most network computer communication is accomplished with the aid of layered software architecture for moving information between host computers connected to the network. The general functions of each layer are normally based on an international standard defined by the International Standards Organization (ISO), named the Open Systems Interconnection (OSI) network model. The OSI model sets forth seven processing layers through which information received by a host passes and made presentable to an end user. Similarly, those seven processing layers may be passed in reverse order during transmission of information from a host to the network.

It is well known that networks may include, for instance, a high-speed bus such as an Ethernet connection or an internet connection between disparate local area networks (LANs), each of which includes multiple hosts or any of a variety of other known means for data transfer between hosts. According to the OSI standard, Physical layers are connected to the network at respective hosts, providing transmission and receipt of raw data bits via the network. A Data Link layer is serviced by the Physical layer of each host, the Data Link layers providing frame division and error correction to the data received from the Physical layers, as well as processing acknowledgment frames sent by the receiving host. A Network layer of each host, used primarily for controlling size and coordination of subnets of packets of data, is serviced by respective Data Link layers. A Transport layer is serviced by each Network layer, and a Session layer is serviced by each Transport layer within each host. Transport layers accept data from their respective Session layers, and split the data into smaller units for transmission to Transport layers of other hosts, each such Transport layer concatenating the data for presentation to respective Presentation layers. Session layers allow for enhanced communication control between the hosts. Presentation layers are serviced by their respective Session layers, the Presentation layers translating between data semantics and syntax which may be peculiar to each host and standardized structures of data representation. Compression and/or encryption of data may also be accomplished at the Presentation level. Application layers are serviced by respective Presentation layers, the Application layers translating between programs particular to individual hosts and standardized programs for presentation to either an application or an end user.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, devices, and programs commonly employed, each layer is necessary to insure that the data can make it to the intended destination in the appropriate form, regardless of variations in hardware and software that may intervene.

In preparing data for transmission from a first to a second host, some control data is added at each layer of the first host regarding the protocol of that layer, the control data being indistinguishable from the original (payload) data for all lower layers of that host. Thus an Application layer attaches an application header to the payload data, and sends the combined data to the Presentation layer of the sending host, which receives the combined data, operates on it, and adds a presentation header to the data, resulting in another combined data packet. The data resulting from combination of payload data, application header and presentation header is then passed to the Session layer, which performs required operations including attaching a session header to the data, and presenting the resulting combination of data to the transport layer. This process continues as the information moves to lower layers, with a transport header, network header and data link header and trailer attached to the data at each of those layers, with each step typically including data moving and copying, before sending the data as bit packets, over the network, to the second host.

The receiving host generally performs the reverse of the above-described process, beginning with receiving the bits from the network, as headers are removed and data processed in order from the lowest (Physical) layer to the highest (Application) layer before transmission to a destination of the receiving host. Each layer of the receiving host recognizes and manipulates only the headers associated with that layer, since, for that layer, the higher layer control data is included with and indistinguishable from the payload data. Multiple interrupts, valuable CPU processing time and repeated data copies may also be necessary for the receiving host to place the data in an appropriate form at its intended destination.

As networks grow increasingly popular and the information communicated thereby becomes increasingly complex and copious, the need for such protocol processing has increased. It is estimated that a large fraction of the processing power of a host CPU may be devoted to controlling protocol processes, diminishing the ability of that CPU to perform other tasks. Network interface cards (NICs) have been developed to help with the lowest layers, such as the Physical and Data Link layers. It is also possible to increase protocol processing speed by simply adding more processing power or CPUs according to conventional arrangements. This solution, however, is both awkward and expensive. The complexities presented by various networks, protocols, architectures, operating devices and applications generally require extensive processing to afford communication capability between various network hosts.

The TCP/IP model is a specification for computer network protocols created in the 1970s by DARPA, an agency of the United States Department of Defense. It laid the foundations for ARPANET, which was the world's first wide area network and a predecessor of the Internet. The TCP/IP Model is sometimes called the Internet Reference Model, the DoD Model or the ARPANET Reference Model.

TCP/IP is generally described as having four abstraction layers (RFC 1122), e.g., as shown in the box below:

| |
| --- |
| Application |
| Transport (TCP or UDP) |
| Internet (IP) |
| Link |

This layer view is often compared with the seven-layer OSI Reference Model formalized after the TCP/IP specifications.

Regarding the layers in the TCP/IP model, the layers near the top are logically closer to the user application, while those near the bottom are logically closer to the physical transmission of the data. Viewing layers as providing or consuming a service is a method of abstraction to isolate upper layer protocols from the nitty-gritty detail of transmitting bits over, for example, Ethernet and collision detection, while the lower layers avoid having to know the details of each and every application and its protocol. This abstraction also allows upper layers to provide services that the lower layers cannot, or choose not to, provide. Again, the original OSI Reference Model was extended to include connectionless services (OSIRM CL). For example, IP is not designed to be reliable and is a best effort delivery protocol. This means that all transport layer implementations must choose whether or not to provide reliability and to what degree. UDP provides data integrity (via a checksum) but does not guarantee delivery; TCP provides both data integrity and delivery guarantee (by retransmitting until the receiver acknowledges the reception of the packet).

The following is a description of each layer in the TCP/IP networking model starting from the lowest level. The Link Layer is the networking scope of the local network connection to which a host is attached. This regime is called the link in Internet literature. This is the lowest component layer of the Internet protocols, as TCP/IP is designed to be hardware independent. As a result TCP/IP has been implemented on top of virtually any hardware networking technology in existence. The Link Layer is used to move packets between the Internet Layer interfaces of two different hosts on the same link. The processes of transmitting packets on a given link and receiving packets from a link can be controlled both in the software device driver for the network card, as well as on firmware or specialist chipsets. These will perform data link functions such as adding a packet header to prepare it for transmission, then actually transmit the frame over a physical medium. The TCP/IP model includes specifications of translating the network addressing methods used in the Internet Protocol to data link addressing, such as Media Access Control (MAC), however all other aspects below that level are implicitly assumed to exist in the Link Layer, but are not explicitly defined. The Link Layer can also be the layer where packets are intercepted to be sent over a virtual private network or other networking tunnel. When this is done, the Link Layer data is considered as application data and proceeds back down the IP stack for actual transmission. On the receiving end, the data goes up through the IP stack twice (once for routing and the second time for the tunneling function). In these cases a transport protocol or even an application scope protocol constitutes a virtual link placing the tunneling protocol in the Link Layer of the protocol stack. Thus, the TCP/IP model does not dictate a strict hierarchical encapsulation sequence and the description is dependent upon actual use and implementation.

Internet Layer: As originally defined, the Internet layer (or Network Layer) solves the problem of getting packets across a single network. Examples of such protocols are X.25, and the ARPANET's Host/IMP Protocol. With the advent of the concept of internetworking, additional functionality was added to this layer, namely getting data from the source network to the destination network. This generally involves routing the packet across a network of networks, known as an internetwork or internet (lower case). In the Internet Protocol Suite, IP performs the basic task of getting packets of data from source to destination. IP can carry data for a number of different upper layer protocols. These protocols are each identified by a unique protocol number: ICMP and IGMP are protocols 1 and 2, respectively. Some of the protocols carried by IP, such as ICMP (used to transmit diagnostic information about IP transmission) and IGMP (used to manage IP Multicast data) are layered on top of IP but perform internetwork layer functions. This illustrates an incompatibility between the Internet and the IP stack and OSI model. Some routing protocols, such as OSPF, are also part of the network layer.

Transport Layer: The Transport Layer's responsibilities include end-to-end message transfer capabilities independent of the underlying network, along with error control, fragmentation and flow control. End to end message transmission or connecting applications at the transport layer can be categorized as either: connection-oriented e.g. TCP, or connectionless e.g. UDP. The Transport Layer can be thought of literally as a transport mechanism e.g. a vehicle whose responsibility is to make sure that its contents (passengers/goods) reach its destination safely and soundly, unless a higher or lower layer is responsible for safe delivery. The Transport Layer provides this service of connecting applications together through the use of ports. Since IP provides only a best effort delivery, the Transport Layer is the first layer of the TCP/IP stack to offer reliability. Note that IP can run over a reliable data link protocol such as the High-Level Data Link Control (HDLC).

Protocols above transport, such as RPC, also can provide reliability. For example, TCP is a connection-oriented protocol that addresses numerous reliability issues to provide a reliable byte stream: data arrives in-order; data has minimal error (i.e., correctness); duplicate data is discarded; lost/discarded packets are re-sent; and, includes traffic congestion control. The newer SCTP is also a "reliable", connection-oriented, transport mechanism. It is Message-stream-oriented, not byte-stream-oriented like TCP, and provides multiple streams multiplexed over a single connection. It also provides multi-homing support, in which a connection end can be represented by multiple IP addresses (representing multiple physical interfaces), such that if one fails, the connection is not interrupted. It was developed initially for telephony applications (to transport SS7 over IP), but can also be used for other applications. UDP is a connectionless datagram protocol. Like IP, it is a best effort or "unreliable" protocol. Reliability is addressed through error detection using a weak checksum algorithm. UDP is typically used for applications such as streaming media (audio, video, Voice over IP etc) where on-time arrival is more important than reliability, or for simple query/response applications like DNS lookups, where the overhead of setting up a reliable connection is disproportionately large. RTP is a datagram protocol that is designed for real-time data such as streaming audio and video. TCP and UDP are used to carry an assortment of higher-level applications. The appropriate transport protocol is chosen based on the higher-layer protocol application. For example, the File Transfer Protocol expects a reliable connection, but the Network File System assumes that the subordinate Remote Procedure Call protocol, not transport, will guarantee reliable transfer. Other applications, such as VoIP, can tolerate some loss of packets, but not the reordering or delay that could be caused by retransmission. The applications at any given network address are distinguished by their TCP or UDP port. By convention certain well known ports are associated with specific applications. (See List of TCP and UDP port numbers.)

Application Layer: The Application Layer refers to the higher-level protocols used by most applications for network communication. Examples of application layer protocols include the File Transfer Protocol (FTP) and the Simple Mail Transfer Protocol (SMTP). Data coded according to application layer protocols are then encapsulated into one or (occasionally) more transport layer protocols (such as the Transmission Control Protocol (TCP) or User Datagram Protocol (UDP)), which in turn use lower layer protocols to effect actual data transfer. Since the IP stack defines no layers between the application and transport layers, the application layer must include any protocols that act like the OSI's presentation and session layer protocols. This is usually done through libraries. Application Layer protocols generally treat the transport layer (and lower) protocols as "black boxes" that provide a stable network connection across which to communicate, although the applications are usually aware of key qualities of the transport layer connection such as the end point IP addresses and port numbers. As noted above, layers are not necessarily clearly defined in the Internet protocol suite. Application layer protocols are most often associated with client-server applications, and the commoner servers have specific ports assigned to them by the IANA: HTTP has port 80; Telnet has port 23; etc. Clients, on the other hand, tend to use ephemeral ports, i.e. port numbers assigned at random from a range set aside for the purpose. Transport and lower level layers are largely unconcerned with the specifics of application layer protocols. Routers and switches do not typically "look inside" the encapsulated traffic to see what kind of application protocol it represents, rather they just provide a conduit for it. However, some firewall and bandwidth throttling applications do try to determine what's inside, as with the Resource Reservation Protocol (RSVP). It's also sometimes necessary for Network Address Translation (NAT) facilities to take account of the needs of particular application layer protocols. (NAT allows hosts on private networks to communicate with the outside world via a single visible IP address using port forwarding, and is an almost ubiquitous feature of modern domestic broadband routers).

Hardware and software implementation: Normally, application programmers are concerned only with interfaces in the Application Layer and often also in the Transport Layer, while the layers below are services provided by the TCP/IP stack in the operating system. Microcontroller firmware in the network adapter typically handles link issues, supported by driver software in the operational system. Non-programmable analog and digital electronics are normally in charge of the physical components in the Link Layer, typically using an application-specific integrated circuit (ASIC) chipset for each network interface or other physical standard. Hardware or software implementation is, however, not stated in the protocols or the layered reference model. High-performance routers are to a large extent based on fast non-programmable digital electronics, carrying out link level switching.

Network bandwidth is increasingly faster than host processors can process traditional protocols. Interrupt pressure has been the bottleneck for TCP/IP over increasing network bandwidths. The solutions that have generally been proposed to alleviate this bottleneck are interrupt coalescing and net-polling, jumbo frames, and TCP offload. Interrupt coalescing and jumbo frames are becoming standards in high-performance networking. However, neither of them delivers a large enough impact at 10 Gbps network speeds and beyond. Several factors have made full TCP offload a less attractive alternative. Full TCP offload requires that all protocol processing be handled by the NIC. This requires a very sophisticated NIC with a great deal of memory for buffering purposes. They are, therefore, cost-prohibitive. Additionally, the memory and processing required make Full TCP Offload scale poorly. Full TCP processing on the NIC also moves control of the network resource away from the operating system. This fundamentally erodes the security of the host since the OS does not have full control of what is entering the memory space or the protocol stack space. Also, the OS has difficulty making dynamic policy decisions based on potential attacks or changes in network traffic. TCP Data Path Offload, in which the flows are created by the OS, but the protocol processing associated with data movement is offloaded, addresses the first issue, but cannot address the second issue since information about the status of the network is not routinely shared with the OS during the flow of data. What is desired, therefore, are improved techniques that can allow for quicker data transfer and can address the needs of networks having relatively high bandwidth delay products.

SUMMARY

The present disclosure is directed to techniques, including methods and architectures, for the acceleration of file transfers over networks. Such techniques can provide for the splitting or "splintering" of packet headers and related files/data during offloading processes.

An aspect of the present disclosure provides engine systems utilizing splintered offload logic. Such engines can include or be implemented with one or more physical interfaces, media access controllers ("MAC"s), and backplane interfaces. Such engines (or portions of such) can be incorporated into NIC circuits including single or multiple components, e.g., field programmable gate arrays ("FPGA"s), application specific integrated circuits ("ASIC"s), and the like.

Another aspect of the present disclosure provides systems that are based upon unique coding and architecture derived from splintered UDP offload technology, resulting in unique FPGA core architectures and firmware (e.g., offload engines).

Embodiments of novel offload engine according to the present disclosure includes NIC architecture with network connections at 10 Gbps, scaling by n×10 Gbps increments.

One skilled in the art will appreciate that embodiments of the present disclosure can be implemented in hardware, software, firmware, or any combinations of such, and over one or more networks.

Other features and advantages of the present disclosure will be understood upon reading and understanding the detailed description of exemplary embodiments, described herein, in conjunction with reference to the drawings.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
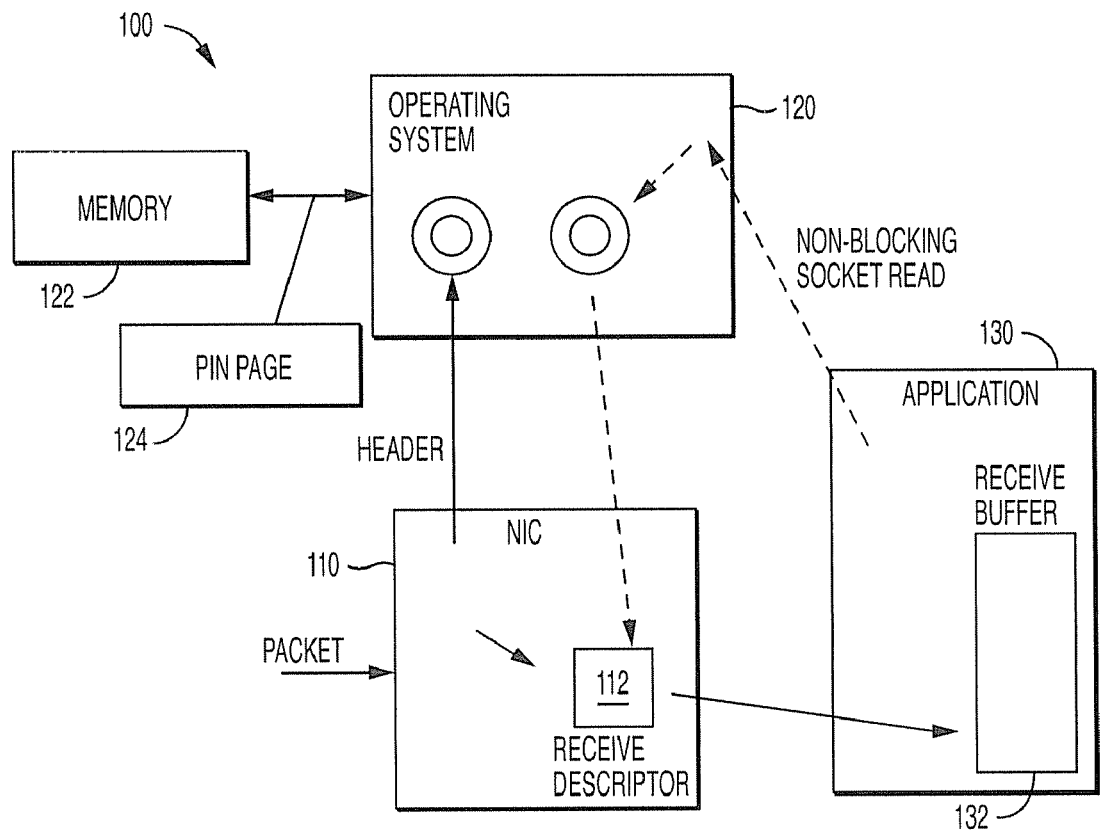
FIG. 1 depicts a diagrammatic view of a path of a splintered packet (e.g., TCP) through a splintered stack architecture, in accordance with exemplary embodiments of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Aspects of the present disclosure generally relate to techniques utilizing novel offload engines based on the architectures implementing splinter offload (or "splintering") logic. Such techniques split off packet data from associated packet header (or descriptor) information. Some variations of splintered offload include/address IP headers where others include TCP headers, and other could include both. Each header has many parameters. Common vocabulary or terminology in both types of headers (IP and TCP) include: source, destination, and/or checksum—priority or urgency. Such architectures can be based on low-cost, high-performance FPGA subsystems. Using network simulations and modeling, embodiments have been verified, e.g., as system feasibility for bandwidths from 10-100+ Gbps. The offload engine system can allow access to distributed and shared data over 10 Gbps and beyond, for various networks. Such techniques can run/implement splintered UDP or TCP on our system up to 100 Gbps. System can accordingly be compatible 10 GigE networking infrastructure, allow for bandwidth scalability. As faster versions of the busses become available, e.g., PCI express bus, embodiments of the present disclosure can provide splintered TCP and UDP operation at higher rates, e.g., 128 Gbps to 1,000+ Gbps f-d for Terabit Ethernet applications.

Splintered offloading techniques (TCP or UDP) with receive batch processing address most of the issues associated with TCP offload, but at a significantly reduced manufacturing price to offload specific functionality to the NIC while maintaining the bulk of the protocol processing in the host OS. This is the core of Splintered offloading according to the present disclosure. The resulting protocol implementation allows the application to bypass the protocol processing of the received data. Such can be accomplished this by moving data from the NIC directly to the application through DMA and batch processing the receive headers in the host OS when the host OS is interrupted to perform other work. Batch processing receive headers allows the data path to be separated from the control path. Unlike operating system bypass, however, the operating system still fully manages the network resource and has relevant feedback about traffic and flows. Embodiments of the present disclosure can therefore address the challenges of networks with extreme bandwidth delay products (BWDP). Example facilities include 10-100 Gbps intracontinental and intercontinental links at national labs and aerospace firms. Bulk Data Transfer in the networks need to be provided the endpoint resources required to ensure high performance in a cost effective manner.

The present inventors have conducted research proving multiples of 10 Gigabits per second (Gbps) through 100 Gbps and higher speeds (e.g., indicated by "n×10 Gbps" in some of the figures). In some implementations it can be possible to fit into one chip or one piece of code. In other implementations, it would be multiples. Embodiments of the present disclosure can be implemented or extend to 1000 Gigabits per second, Aspects of the present disclosure can provide and/or incorporate algorithms for the following: (i) IP (or TCP) offload transmit, and receive; (ii) TCP (or IP) checksum on a FPGA; (iii) separation of packet headers from data; (iv) packet de-multiplexing for pre-posted read; (v) support for out of order packet reception; (vi) supporting memory, accompanied (e.g., Verilog) subsystems as needed; and/or, (vii) supporting DMA engines. The algorithms can each be translated into block diagrams to be used for writing, e.g., Verilog code.

As a preliminary matter, the following definitions are used herein: quantum: amount of time assigned to a job. Quantum expiry: the time can expire in which case the priority of the job may be changed. Job: a program, file, or a unit of work. Header processing: the "utilization of" or "calculation using" header parameters. Moreover, the term "storage location" can include reference to one or more buffers and/or permanent memory, e.g., in a local device/system or a distributed system such as over the Internet.

Splintered TCP with Protocol Bypass

FIG. 1 depicts a diagrammatic view of a path of a splintered packet (e.g., TCP) through a splintered stack architecture of an offload engine 100, in accordance with exemplary embodiments of the present disclosure. As shown, the engine can include a physical device 110, e.g., a NIC or network interface circuit, interfacing with an operating system 120 and a software application 130. The NIC 110 can include a descriptor (or header) table 112. The operating system 120 can be associated or linked with (or connected to) host memory 122 and configured and arranged to perform a page pinning 124 to the memory 122. The application can include a receive buffer 132. As used herein, "linked," "connected" and "coupled" can have the same meaning; also, while a physical device is referenced as interfacing with a network, suitably functioning software or firmware can also or in substitution be used.

FIG. 1 shows the path of a splintered packet (e.g., a TCP packet) through the architecture 100, which may be referred to as a "Splintered TCP" stack. The management/production of a Splintered TCP is designed to keep TCP flow management and network resource management with the operating system (OS) while moving data quickly and directly from the network interface card (NIC) to the application. Splintered TCP preferably includes that the application that is to receive data pre-post a receive to the operating system. The operating system can lock the page of memory associated with the storage location (e.g., buffer, permanent memory, or the like) in application-space that will receive the data. Then the operating system creates a very small receive descriptor and informs the physical device (e.g., NIC) that a receive is being pre-posted. As policy, the operating system can choose to create a timeout value for the pre-posted receive so that if no data is received in the buffer within a certain amount of time, the receive is invalidated and the memory is unlocked. When the OS informs the physical device (e.g., NIC) of the pre-posted receive, a copy of the receive descriptor is added to the NICs pre-posted receive table. When a message arrives, the physical device simply checks against the table by using a standard hash (e.g., MD-5) of the source IP, source port, destination IP and destination port. If the data is part of a pre-posted receive, the data is sent (or DMA'd) to the appropriate offset in the application memory space. The headers are DMA'd to the host OS in a circular queue. When the host OS is interrupted for other work or on quantum expiry, the OS processes the headers in the receive queue.

It is important to note that normal traffic is sent to the operating system in the traditional manner. This allows Splintered TCP to use the normal TCP/IP stack in the operating system on the host to do, as it should, all error-detection and error-correction.

Figure 2:
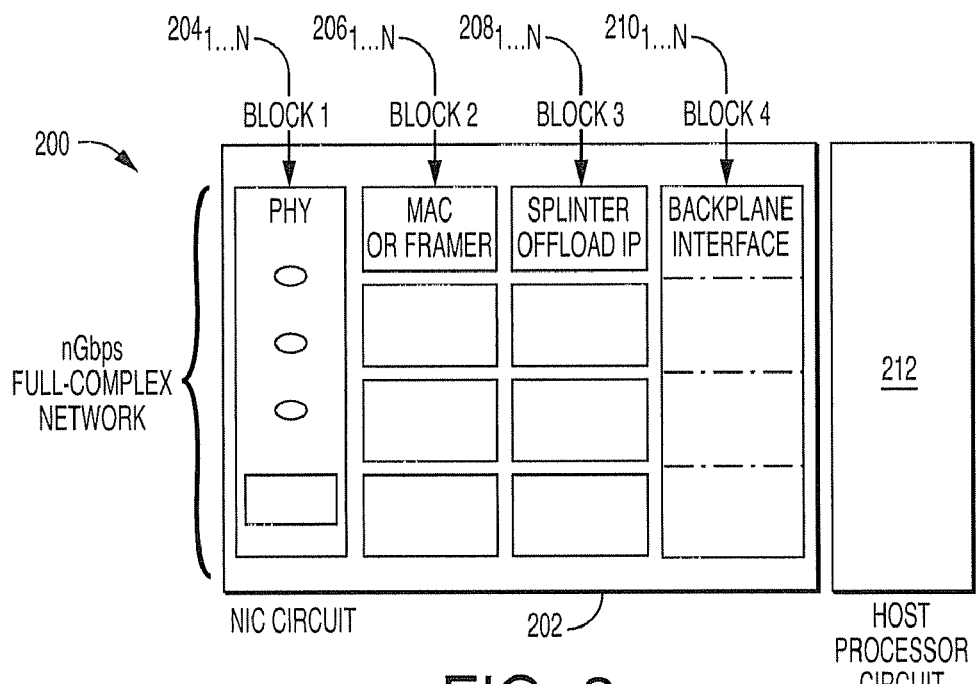
FIG. 2 depicts a diagrammatic view of a NIC circuit architecture in accordance with an exemplary embodiment of the present disclosure.

FIG. 2 depicts a diagrammatic view of a NIC circuit system/architecture 200 in accordance with an exemplary embodiment of the present disclosure. The architecture can provide splintered offload of packets, at 64 Gigabits per second ("Gbps"), e.g., the current practical limit of PCI Express X16 Gen II (PCIe-X16 Gen II), and scalability to 100 Gbps full-duplex (f-d). Systems incorporating architecture 200 can accordingly provide splintered packet (UDP, TCP, IP) offload technology, resulting in unique FPGA core and firmware architecture.

The offload engine system 200 allows access to distributed and shared data over 10 Gbps and beyond, for networks. Such systems can run splintered UDP or TCP up to 100+ Gbps for various application. Systems can be compatible 10 GigE networking infrastructure, allow for bandwidth scalability.

Because of the inherent limitations in the TCP protocol and to facilitate scaling to 100+ Gbps f-d, the UDT variant of UDP can be used. Commercial applications of embodiments of the present disclosure can include core IP to be marketed to FPGA manufacturers, core IP distributors, offload engine manufacturers, and motherboard and systems manufacturers who require offload engine system-on-chips for their motherboards. Such can also provide an entire offload engine NIC: hardware and firmware to the motherboard and systems manufacturers of cluster and Grid computing products. Embodiments can differ from market solutions because of 10-100 Gbps splintered TCP/IP/UDP acceleration engine, compatible with present networking infrastructure for Grid computing, while providing for future bandwidth scalability.

FPGA Core

Figure 3:
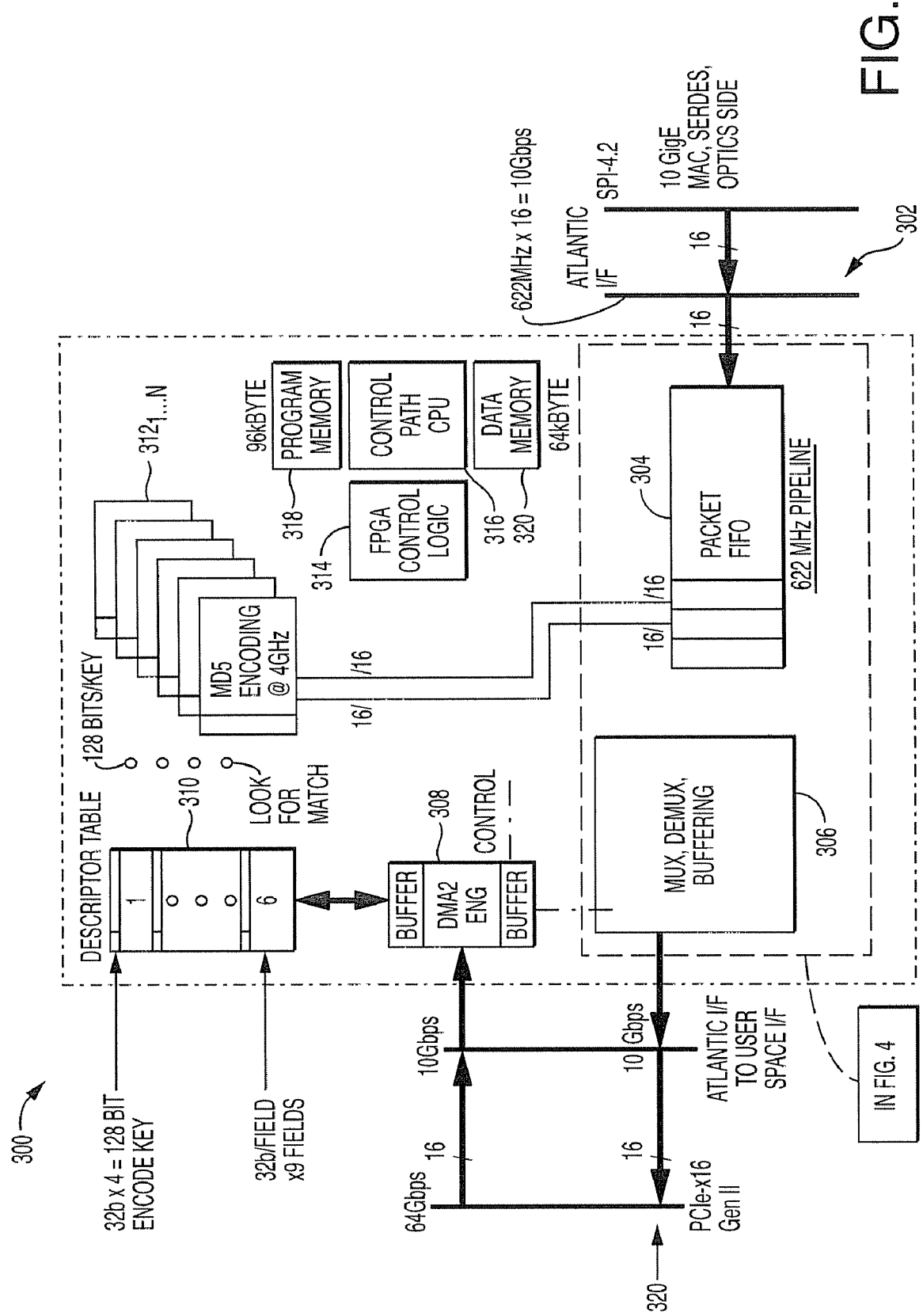
FIG. 3 depicts a diagrammatic view of a splintered offload engine in accordance with an exemplary embodiment of the present disclosure.

FIG. 3 depicts a diagrammatic view of a splintered offload engine 300 in accordance with an exemplary embodiment of the present disclosure. As shown, architecture 300 can utilize a PCIe-X16 GenII bus in a 64 Gbps offload configuration.

Referring to FIG. 3, the following offload system-on-chip architecture, we now discuss the receive side of the offload engine composition which makes-up the FPGA I.P. One MD5 encoder output is matched against one descriptor. There are six descriptors, hence 6 encoders. This is for one 10 Gbps path. There are six such paths, but the descriptor table is the same for all. This allows for six packets to simultaneously be checked against the descriptor table. There are six packet paths for 60 Gbps total. Instead of MD5, other types of hash, for example but not limited to SHA-1, have been proven to be feasible; others may be used as well.

When the incoming packet reaches the next to last stages of the packet FIFO, the encoding checks for a match within the buffer pool (descriptor table). If there is a match, the packet then exits the FIFO, and at the same rate, the packet is transferred to the listed packet buffer. When the complete packet is transferred, the DMA engine transfers the packet from the listed Packet Buffer to the Altera Atlantic I/F, for output to host over the PCIe-x16 Gen II bus (64 Gbps f-d). The Atlantic interface is Altera's standard, generic bus when connecting to high-speed data interfaces. The Atlantic interface is one example, and examples of other suitable interfaces can include, but are not limited to SPI-4.2 or later versions, FIFO interfaces, or generic User Space to PCI express interfaces.

For both listed and unlisted packet buffers, the data is written in at 622 MHz. Either the listed packet buffer or unlisted packet buffer is write enabled and written at 622 MHz. Since the pipeline and buffers are 16 bits wide, this corresponds to 10 Gbps for either path. The DMA engine output is at the same rate, transferring either listed or unlisted packets to the PCIe-x16 Gen II bus. The design is scalable to later or subsequent versions of the PCI express bus or other host interfaces. The Altera GX130 FPGA's are equipped with programmable equalization to compensate for signal degradation during transmission. This enables the ultra high-speed interfaces such as the PCIe signals and Altera Atlantic interface. In normal operation, the DMA engine transfers data out in the same order it came in; control logic selects between listed and unlisted packet buffer. The order may be overridden, may be changed to reclaim mode (unlisted packets) or use tagged command queuing, depending how the host writes to the control registers.

With continued reference to FIG. 3, the Atlantic interface (I/F) is Altera's standard, generic bus when connecting to high-speed data interfaces. One Atlantic I/F is write enabled at a time. After the block is filled with a 32 kByte packet, the next Atlantic I/F is write enabled. There are a total of 6: 10 Gbps paths for 60 Gbps.

While being applicable to TCP/IP, system 300 is also applicable to UDP. Splintered UDP, however, may be more involved. The only dependency that arises when more cores are added is contention for the shared resources (the MAC engine and the DMA engine). An assumption may be made that the application will poll for completion of a message.

The descriptor can contain one or more of nine fields: SRC_IP, SRC_PORT, DST_IP, DST_PORT, BUFFER_ADDRESS, BUFFER_LENGTH, TIMEOUT, FLAGS, and PACKET_LIST. The timeout and flags fields allow for MPI_MATCH on the NIC and greatly increase the efficiency of MPI. The timeout field is necessary since a mechanism may be needed for returning pinned pages if memory resources are constrained.

basic CPU command functions. The embedded "program memory" is simply one of the FPGA resources, and is loaded via the FPGA control logic, during power-up and initialization. Other examples of a suitable CPU include any embedded FPGA processor, or with external interface logic a microcontroller or microprocessor can be used.

The offload engine calculates TCP checksum which is then compared with the original checksum in the TCP header. If the two values do not agree, then it is assumed that the packet was transmitted in error and a request is made to have the packet re-transmitted. The offload engine therefore "drops" the packet and therefore the NIC does not send the flag for "transaction complete" to user space. For an exemplary implementation, a Verilog module was created for performing the checksum calculations and performed a bottleneck analysis simulation to determine the precise location for all checksum components (data word addition, carry add, 1's complement, and appending checksum to packet stream).

Figure 4:
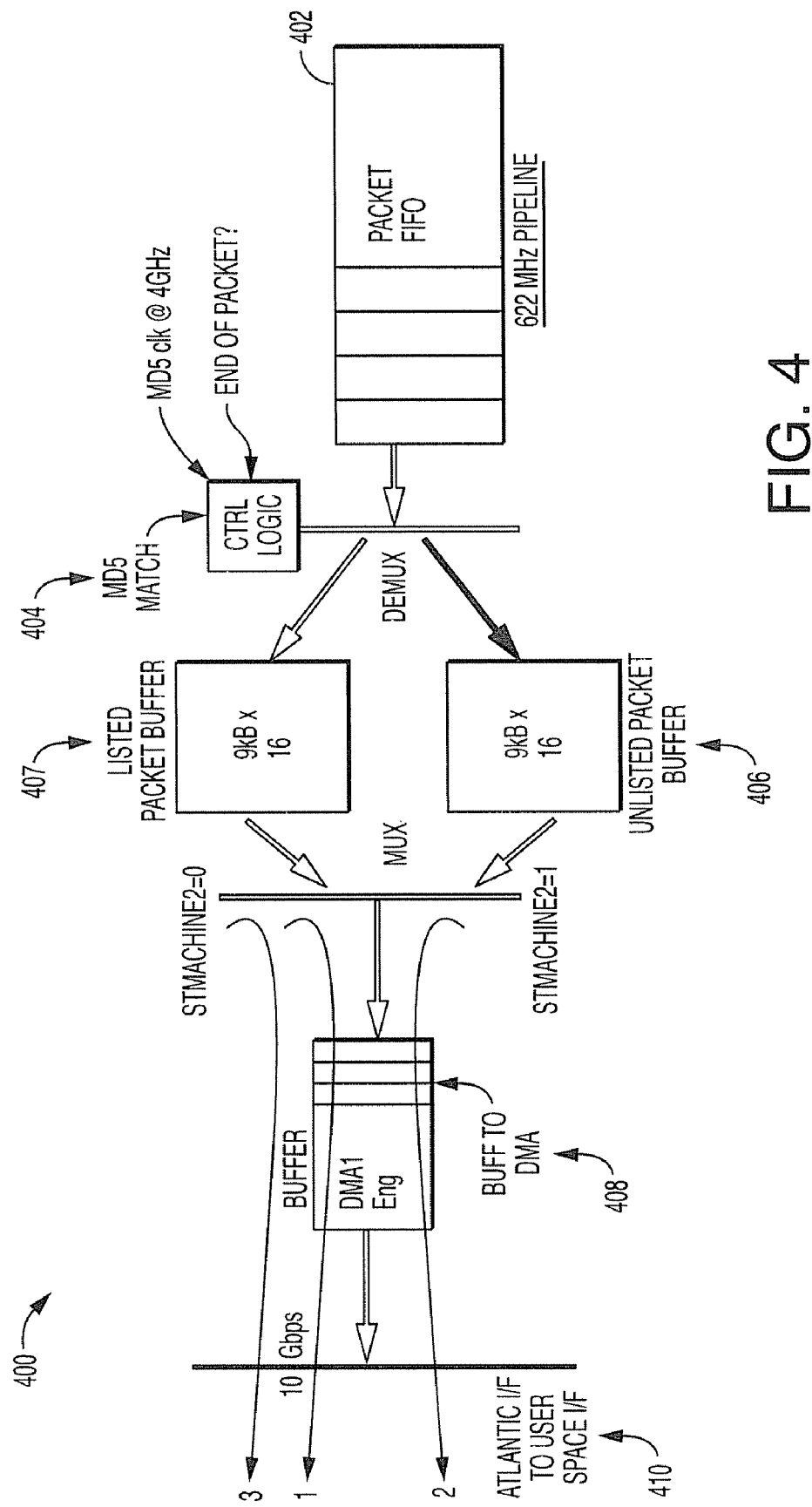
FIG. 4 depicts an enlarged view of a portion of FIG. 3 showing a packet receive process and architecture in accordance with an exemplary embodiment of the present disclosure.

FIG. 4 depicts an enlarged view of a portion of FIG. 3 showing a packet receive process and architecture in accordance with an exemplary embodiment of the present disclosure. More particularly, FIG. 4 shows a detailed view of buffer 304 and mux, demux, buffer 306 in FIG. 3. Architecture 400

TABLE 1

EP2SGX130FF1508C4 FPGA Resources:

| | LE's | alut | bits ram | 512 b ram block | 4 kb ram block | I/O pins |
|---|---|---|---|---|---|---|
| Transmit path | | | | | | |
| atlantic i/f | 0 | 900 | 0 | 0 | 0 | 96 in |
| UDP calculate/insert | | 21,000 | | | | |
| control logic | 0 | 180 | 0 | 0 | 6 | 50 i/o |
| spi-4.2 | 900 | 0 | 0 | 0 | 14 | 96 out |
| Receive Path | | | | | | |
| atlantic i/f | 0 | 900 | 0 | 0 | 0 | 96 in |
| | | | | | | 96 out |
| spi-4.2 i/f | 1014 | 0 | 0 | 0 | 15 | 96 in |
| descriptor table | 0 | 0 | 16k | 0 | 0 | n/a |
| sha-1 encoder | 15,048 | 0 | 0 | 0 | 0 | n/a |
| DMA eng | 0 | 360 | 432k | 0 | 12 | n/a |
| UDP cksum&compare | | 21,000 | | | | |
| control logic | 0 | 180 | 0 | 0 | 6 | 50 i/o |
| listed packet buffer | 0 | 0 | 864k | 0 | 0 | n/a |
| unlisted packet buffer | 0 | 0 | 864k | 0 | 0 | n/a |
| packet fifo | 0 | 0 | 864k | 0 | 0 | n/a |
| total | 16,962 | 44,520 | 3040k | 0 | 53 | 580 |
| specification | 132,540 | 106,032 | 6747k | 699 | 609 | 734 |

Totals for each core within FPGA in FIG. 3

All of the major cores required for implementing the SPLINTERED UDP Offload Engine are summarized in the FPGA table, along with the FPGA resources they require. This table is a consolidation of both fitted code and consumption per core specifications, for a total of 6 paths (60 Gbps f-d):

With continued reference to FIG. 3, some of the control logic is also given in the system diagram. The control-path CPU is accessed during PCIe-X16 cycles where the host is coding-up the FPGA. The control-path CPU writes registers and performs "code-up" within each of the FPGA's devices in conjunction with the DMA2 engine. The control-path CPU performs reads and sends back the results via the DMA1 engine's buffer, back to the host. For exemplary embodiments, the control path CPU can be an Altera Nios II embedded "soft processor" which comes with its own library of can include packet FIFO buffer 402 as part of a pipeline, e.g., a 622 MHz pipeline as shown though other can be implemented. Control logic 404, e.g. suitable for a MD5 match, can pass packet through a demux process to an unlisted packet buffer 406 and a listed packet buffer 407 connected to DMA engine 408. DMA engine 408 can be connected to interface 410.

As can be discerned in FIG. 4, once a packet is written into either buffer, that specific buffer increments its write pointer to the next available packet space. Once a buffer has a complete packet, its ready flag signals the logic for the DMA1 engine. The DMA1 engine clocks data out from the buffer at 4 GHz. This can be accomplished by using the same buffering and clocking logic taken from the MD5 core.

Figure 5:
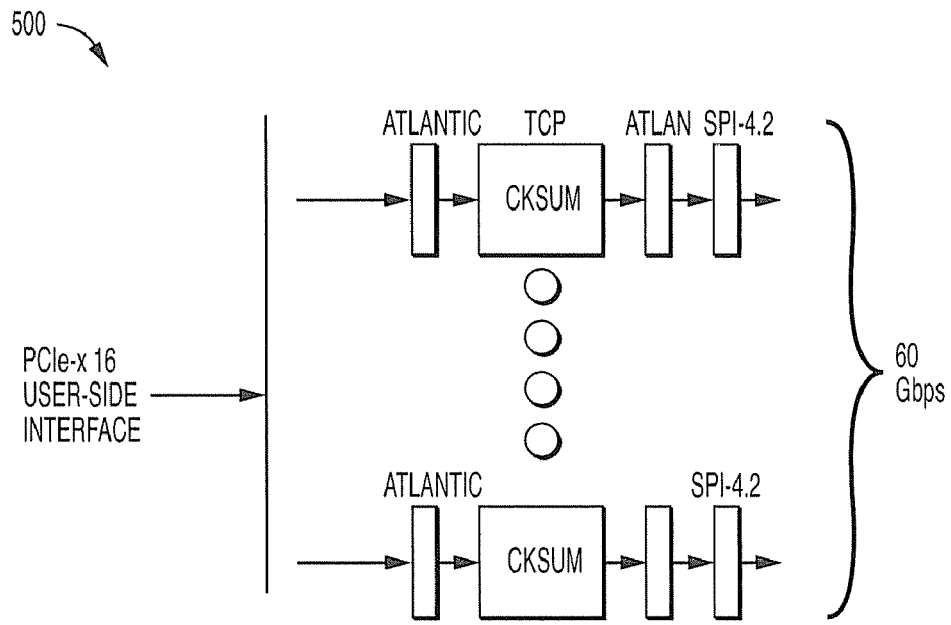
FIG. 5 depicts a diagrammatic view of an alternate packet transmit process and architecture in accordance with a further embodiment of the present disclosure.

FIG. 5 depicts a diagrammatic view of an alternate packet transmit process and architecture 500 in accordance with a further embodiment of the present disclosure. Architecture 500 includes dual SPI-4.2 fully duplexed interfaces, as shown.

Figure 6:
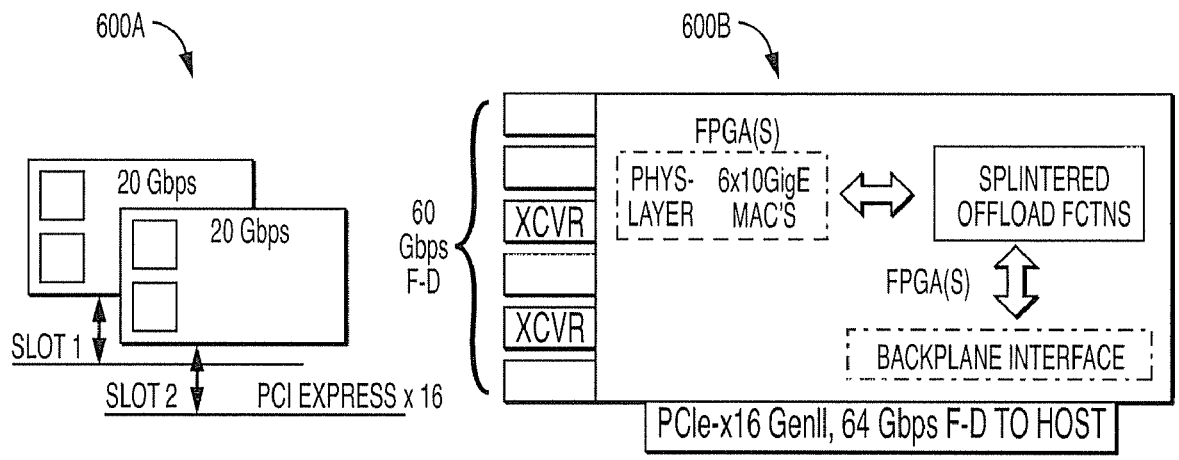
FIG. 6 depicts diagrammatic representation of 40 Gbps bandwidth and 60 Gbps bandwidth embodiments of the present disclosure.

FIG. 6 depicts diagrammatic representation of a 40 Gbps bandwidth embodiment 600A and a 60 Gbps bandwidth embodiment 600B, in accordance with of the present disclosure. As shown, the 40 Gbps bandwidth embodiment 600A can include two network interface cards, and a Generation 1 PCI Express X16 backplane. The 60 Gbps bandwidth embodiment can include a single board offload engine running in 1 slot through 60 Gbps f-d.

Using the 10 Gbps data rate, the present inventors determined the amount of bits that could be stored in 1 second; the memory external to the FPGA can be selected by appropriate scaling, as was done for an exemplary embodiment. For each 10 Gbps path, the present inventors determined that the offload NIC would need 1.1 GByte Double-Data Rate (DDR2) RAM to adjust a packet rate from 10 Gbps reduced down to 1 Gbps. The DDR2 SDRAM specifications for waveform timing and latencies and refresh cycles indicate that the DDR2 SDRAM can be used on the Altera S2GX PCIe dev kit utilized for the present disclosure. Each development board used was provided with four x16 devices: device#MT47H32M16CC-3.

For verification purposes, the present inventors modeled the performance of an embodiment of FIG. 6. Accounting for the need for a refresh cycle, the throughput would be 700 kbit over a time of (70 usec+1 cycle delay), directly translating into 9.99 kb/usec (9.99 Gbps). For feasibility purposes, this bandwidth is seen as being practically the same data rate (no bottleneck) as 10 Gbps. Thus, for certain applications, the buffering internal to the FPGA can be sufficient and no external memory may be required on the NIC.

Extensible Message Oriented Offload Model

Figure 7:
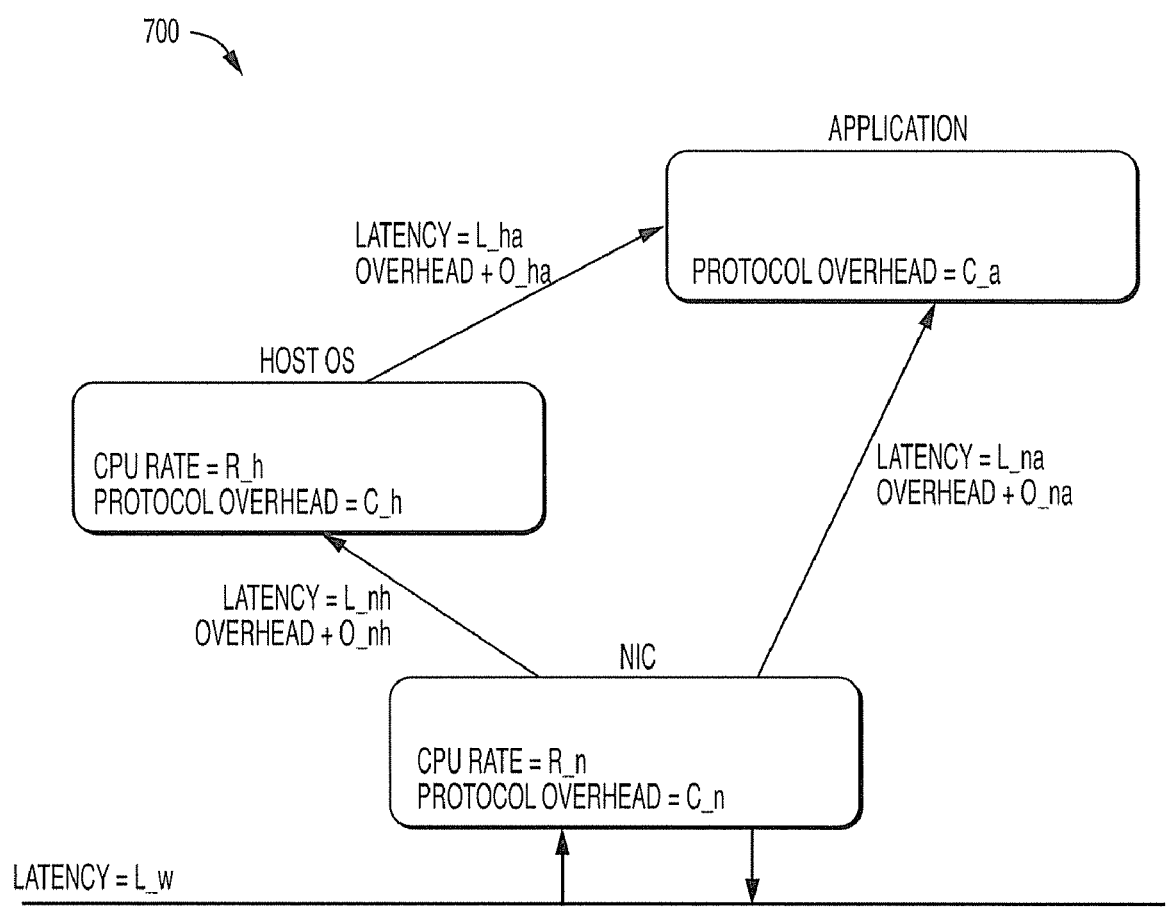
FIG. 7 depicts a diagrammatic view of an extensible message oriented offload model ("EMO") for a receive process, in accordance with an embodiment of the present disclosure.

FIG. 7 depicts a diagrammatic view of an extensible message oriented offload model ("EMO") 700 for a receive process, in accordance with an embodiment of the present disclosure. The EMO model was used to verify/model the Splintered TCP throughput. The EMO model was verified by comparing the throughput of two machines using the Linux TCP stack and the modeled throughput.

The EMO model 700 uses microbenchmarks combined to determine latency and overhead for a protocol. Drawings FIG. 7 shows the EMO model for a receive. EMO allows us to use information about the Splintered TCP NIC to estimate the latency and throughput of Splintered TCP. Using EMO, we can model the latency of a traditional TCP latency as:
Latency=L_w+C_n/R_n+L_nh+C_h/R_h+L_ha The EMO model was verified as being accurate by the use of two Pentium Pro Duo machines with Intel e1000 NICs in a crossover configuration using Linux 2.6.22 operating system. Timings were added to both the kernel and the TCP client and TCP server test applications. The present inventors were unable (during the verification process) to (i) directly time the DMA from the NIC to the host OS (L_nh), and (ii) directly time the amount of work performed in the NIC (C_n/R_n). They did, however, get reasonable timings of the other microbenchmarks necessary to verify EMO. The EMO was observed to generally underestimate the latency by about 23%, however, the gain on the system was seen to be consistent. The consistency is important as it shows that any caching or scheduling randomness does not affect the latency at this level.

Modeling Verification

The present inventors modeled embodiments of Splintered TCP using the above-described EMO. The latency of standard TCP and TCP was initially using interrupt coalescing using a Pentium Pro Duo with 1.86 GHz processors, but this created an artificial limit in the speed of the PCI-Express bus and the speed of the processor. Subsequently, the present inventors assumed a machine with a 3 GHz processor and a PCIe bus on the order of 100 Gbps f-d (our results have essentially been limited by the PCIe bus bandwidth itself). For this, the average number of cycles on the receive host determined during EMO model verification (200,000) was used, with the assumption that there was little or no time spent on the traditional NIC. An interrupt latency (the limiting factor) of 4 microseconds was assumed (which is the traditional advertised interrupt latency for Intel Pentiums). The limiting factor for Standard TCP is the interrupt latency (since we assume multiple interrupts per message). The limiting factor for TCP with Interrupt Coalescing is the context switch latency of 7.5 microseconds. Splintered TCP has no context switch or interrupt so the limiting factor becomes the speed of the PCI-Express bus.

Splintered TCP with protocol bypass was shown to provide the performance necessary to provide per-flow bandwidth up to 128+ Gbps. Accordingly, embodiments of the present disclosure can provide a viable, inexpensive alternative for 100 Gbps networks using Ethernet. The number of connections that can be served by a Splintered TCP NIC may depend on the size (and therefore expense) of the NIC itself as memory will be the most costly addition to the Splintered TCP NIC. Splintered TCP connections can, for some applications, be brokered by an application library.

Figure 8:
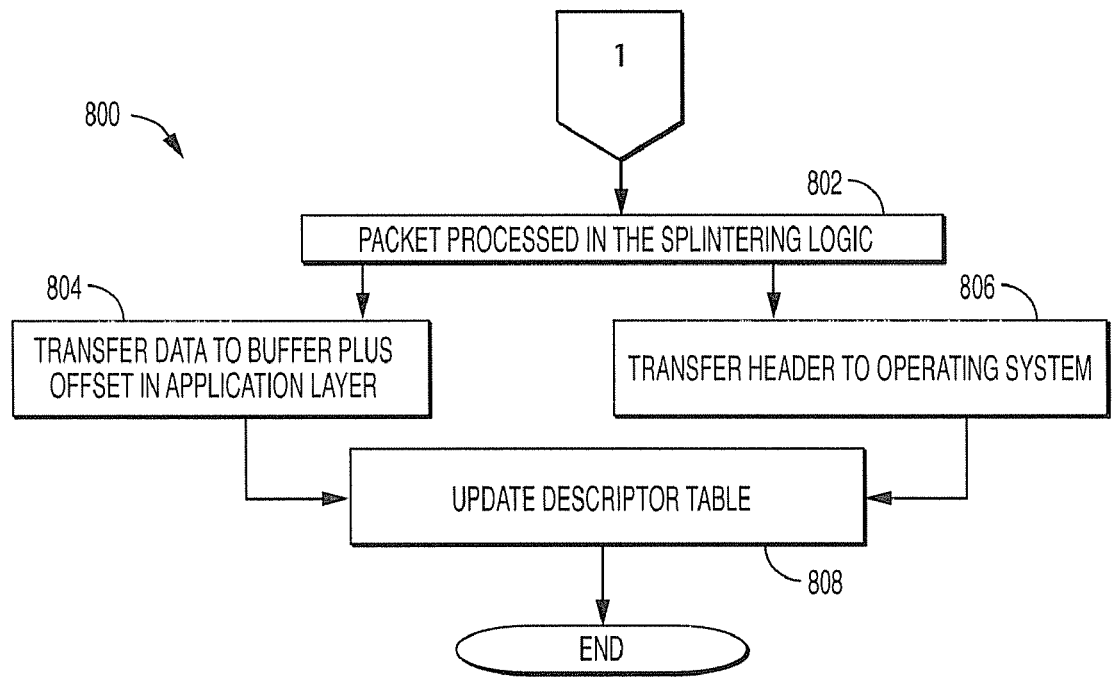
FIG. 8 depicts a method of packet splintering in accordance with exemplary embodiments.

FIG. 8 depicts a method of packet splintering in accordance with exemplary embodiments. As shown in FIG. 8, at an initial start stage 802 a packet can be processed by (in) splintering logic; starting stage 802 is shown linked to reference character 1 for the subsequent description of FIG. 10.

With continued reference to FIG. 8, when splintering is appropriate (e.g., the header is listed in a descriptor table), the packet data can be transferred to an application layer (e.g., into a buffer or memory location/address), as described at 804. The packet header can be transferred to the operating system, as described at 806. A descriptor table in hardware, e.g., NIC, can be updated to receipt of the packet data, as described at 808.

Figure 9:
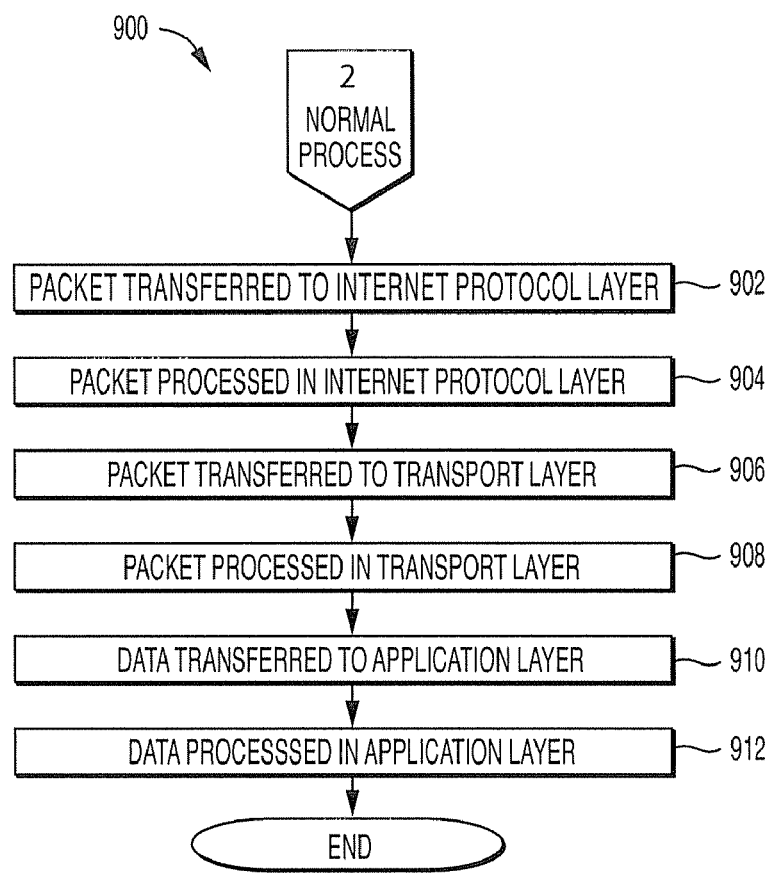
FIG. 9 depicts a packet processing method in accordance with an embodiment of the present disclosure.
Figure 10:
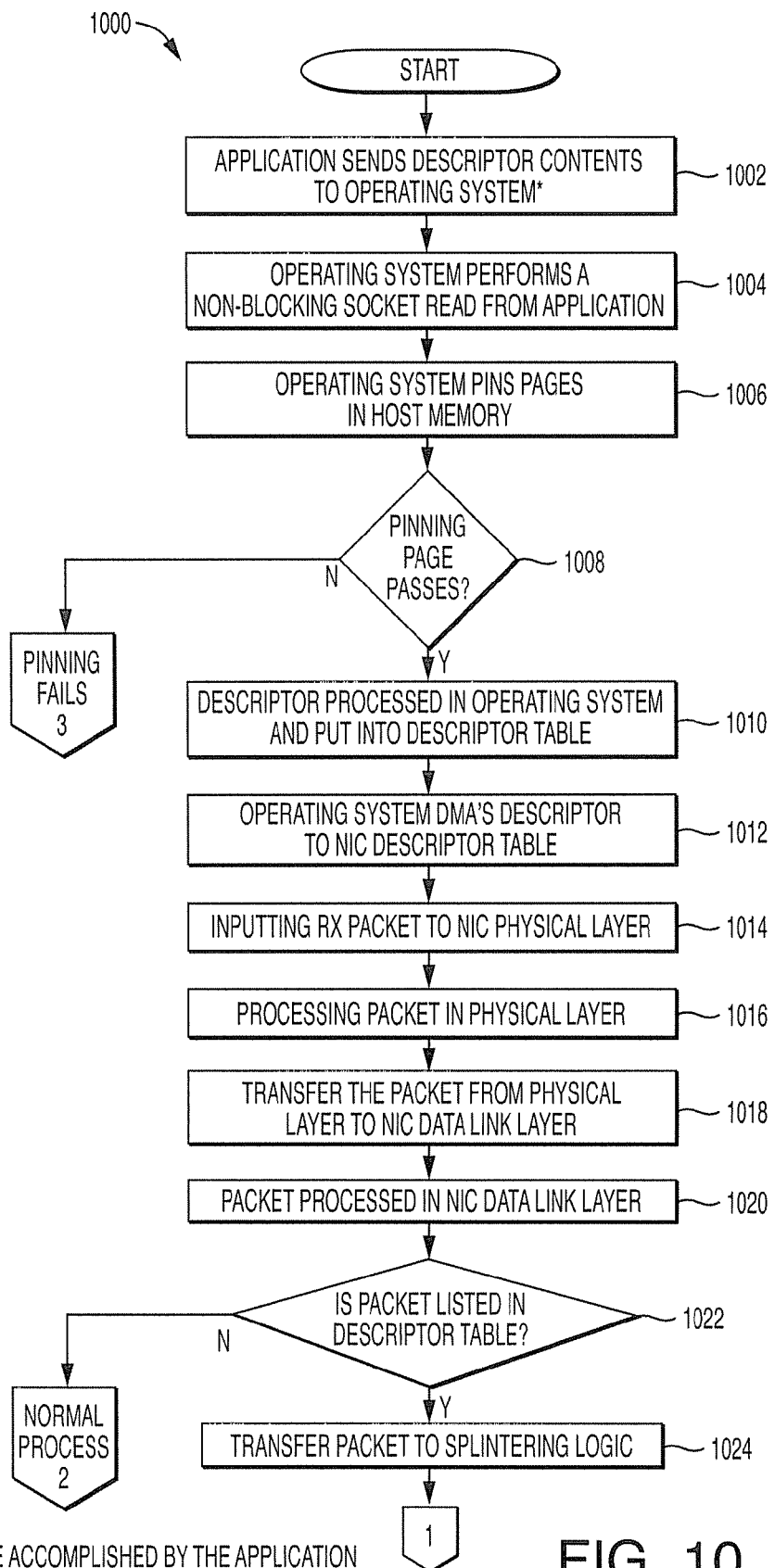
FIG. 10 depicts a further embodiment of a packet processing method, in accordance with the present disclosure.

FIG. 9 depicts a packet processing method 900 in accordance with an embodiment of the present disclosure; starting stage 902 is shown linked to reference character 2 for the subsequent description of FIG. 10. A packet can be transferred to an internet protocol layer, as described at 902. The packet can be processed by the internet protocol layer, as described at 904. The packet can then be transferred to the transport layer, as described at 906.

Continued with the description of method 900, the packet can be processed in the transport layer, as described at 908. The packet data can be transferred to an application layer, as described at 910. The data can then be processed in the application layer, as described at 912.

FIG. 10 depicts a further embodiment of a packet processing method 1000, in accordance with the present disclosure. Method 1000 includes options for implementing procedures/methods according to FIGS. 9-10, and 11, as will be described.

For method 1000, an application can send descriptor/header contents to an operating system, as described at 1002. The operating system can perform a non-blocking socket read from the application, as described at 1004. The operating system can then attempt to pin a page (or pages) in host memory, as described at 1006. If the pinning fails, the operating system can perform a batch process of all headers (indicated by "3"), as further shown and described for FIG. 11.

In response to a successful pinning page pass, the descriptor can be processed in the operating system and put into a descriptor table in the operating system, as described at 1010. The operating system can then send (e.g., DMA) the descriptor to an NIC (hardware) descriptor table, as described at 1012. The received packet (data) can be input to the NIC physical layer, as described at 1014. The packet can be processed in the physical layer, as described at 1016. The packet can be transferred from the physical layer to a NIC data link later, as described at 1018, for processing, as described at 1020.

Continuing with the description of method 1000, a query can be performed to see if the packet is listed in the descriptor table, as described at 1022. If the packet is not listed in the descriptor table, normal processing of the packet can occur (indicated by "2"), e.g., as previously described for method 900. If, on the other hand, the packet is listed in the descriptor table, the packet can then be transferred to splintering logic (indicated by "1"), e.g., as previously described for method 800.

Figure 11:
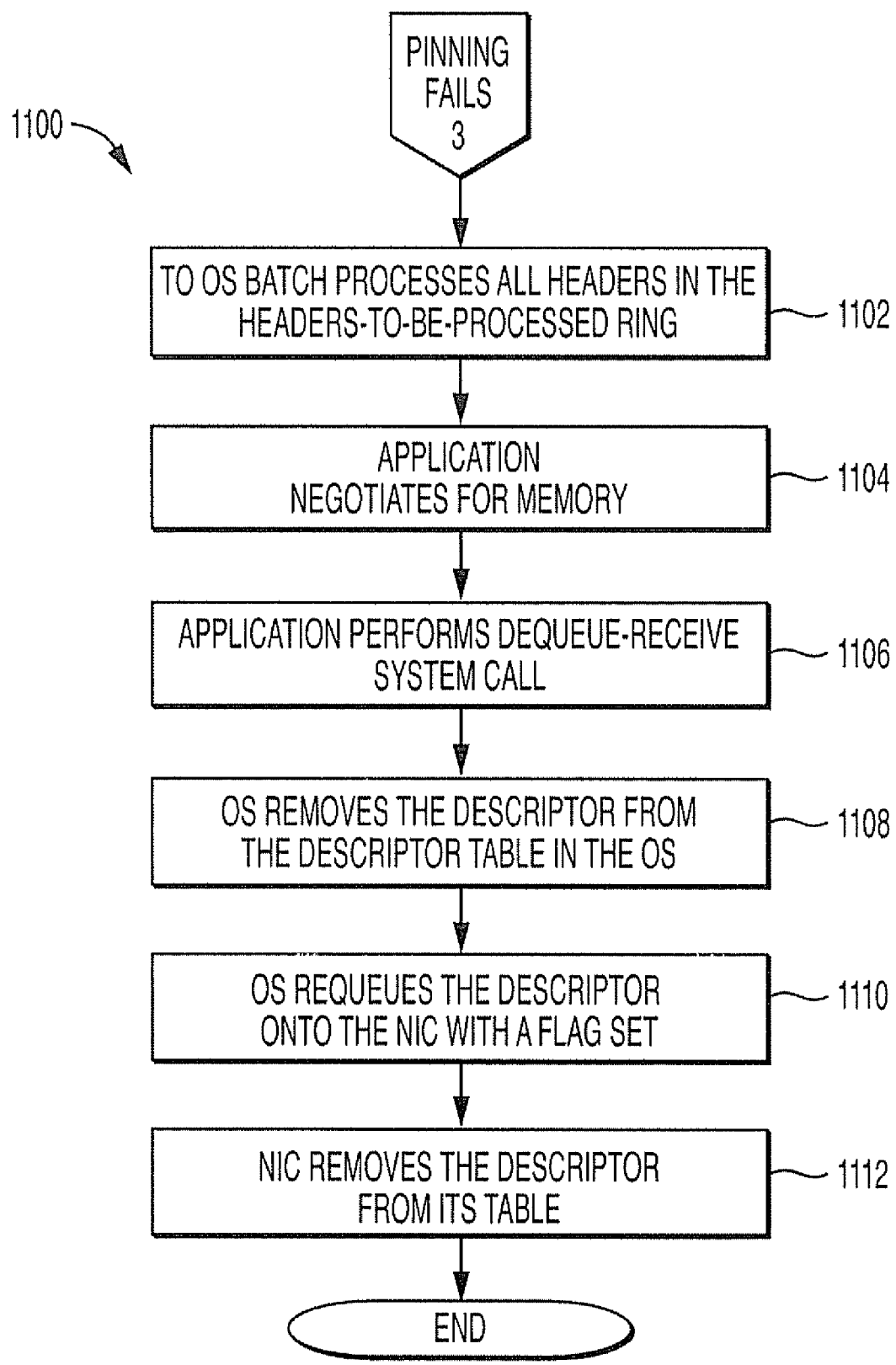
FIG. 11 depicts a further embodiment of a packet processing method, in accordance with the present disclosure.

FIG. 11 depicts a further embodiment of a packet processing method 1100, in accordance with the present disclosure. Method 1100 can be useful in the case where a pinning attempt fails, e.g., for an unsuccessful outcome at 1008 of method 1000.

For method 1000, in response to an unsuccessful pinning attempt, the operating system can perform a batch process of all headers, e.g., those in a headers-to-be-processed ring, as described at 1102. The associated application can negotiate for memory, as described at 1104. The application can perform a de-queue-receive system call, as described at 1106. The operating system can remove the descriptor from the descriptor table in the operating system, as described at 1108. The operating system can re-queue the descriptor onto the NIC with a flag being set, as described at 1110. The NIC can then remove the descriptor from the NIC descriptor table, as described at 1112.

Figure 12:
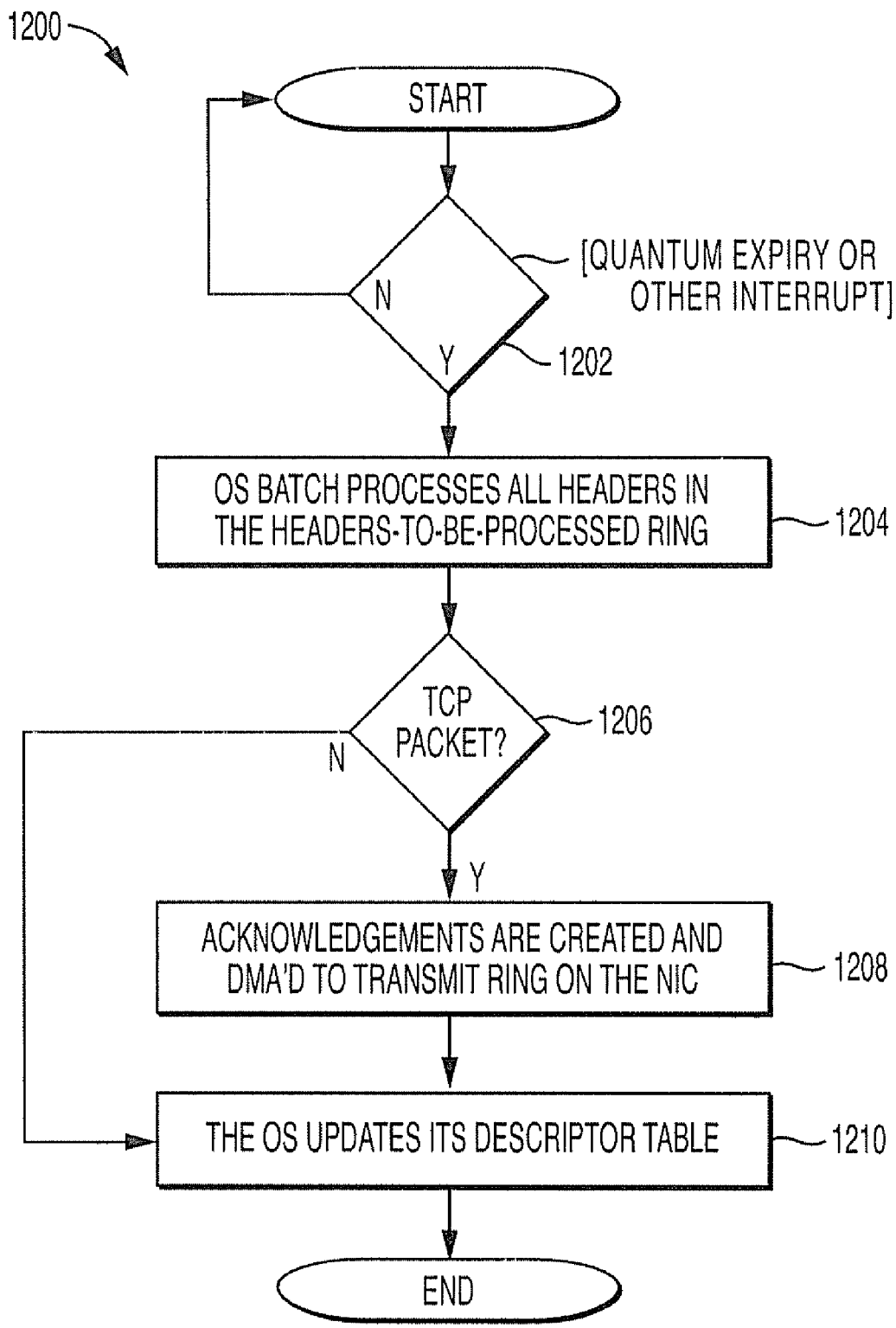
FIG. 12 depicts a processing method, in accordance with the present disclosure.

FIG. 12 depicts a processing method 1200 for an operating system to process headers, in accordance with an embodiment of the present disclosure. A check can be made for the occurrence of an interrupt, e.g., a quantum expiry or other interrupts, as described at 1202. Upon the occurrence of such an interrupt, an operating system can batch process all headers stored, e.g., in a headers-to-be-processed ring/buffer, as described at 1204. A determination can be made as to whether a header is associated with a TCP packet, as described at 1206.

Continuing with the description of method 1200, in response to a determination that the header is associated with a TCP packet, acknowledgment can be created and send (e.g., by a DMA process) to a transmit ring on the NIC, as described at 1208. Then (or after a negative determination at 1206) the operating system can update its descriptor table, as described at 1210. It should be understood, that except for 1206, all other instances of "TCP" as used herein are applicable to UDP.

Figure 13:
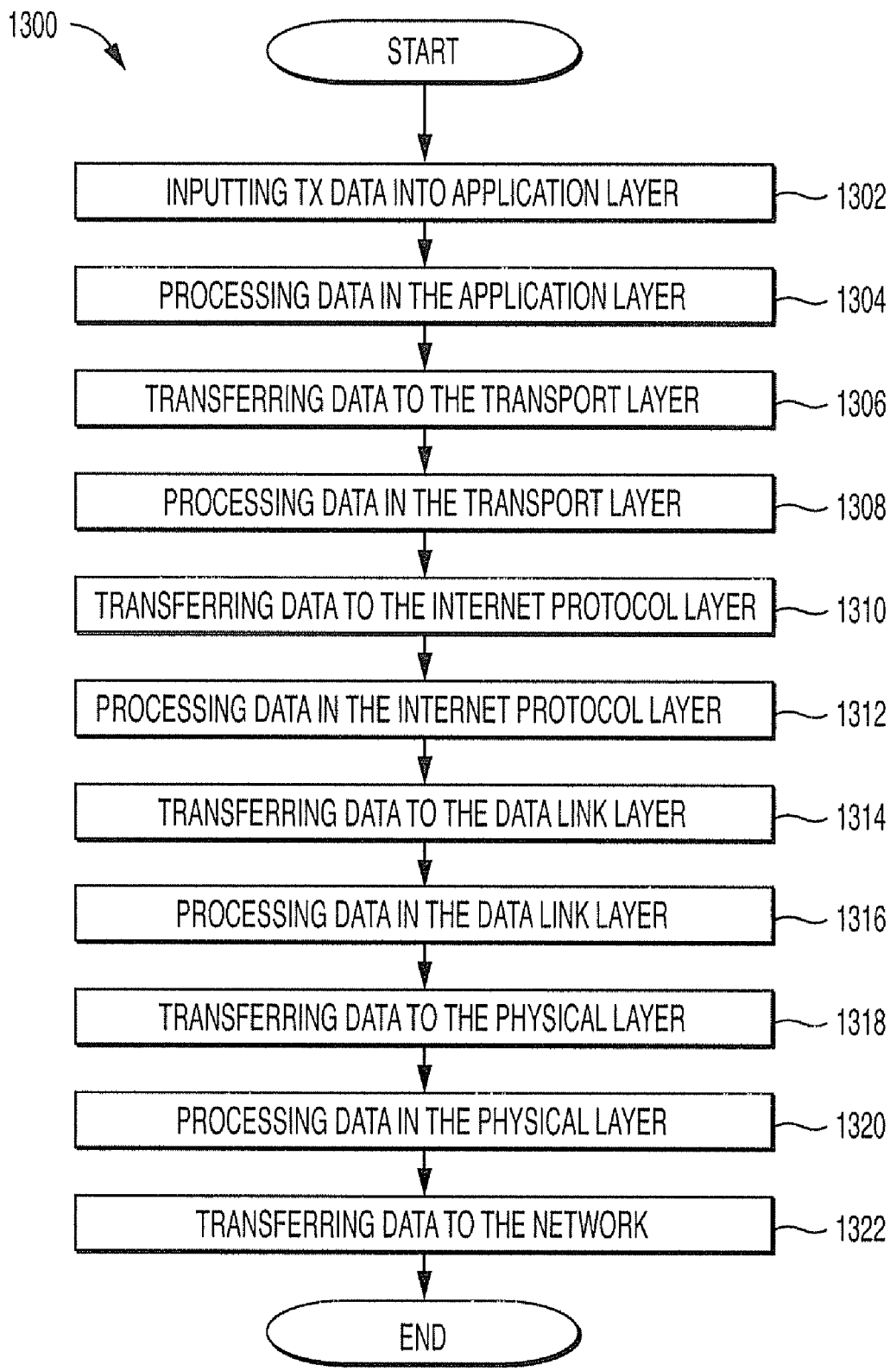
FIG. 13 depicts a further embodiment of a method in accordance with the present disclosure.

FIG. 13 depicts a method 1300 of transmitting processed data after splintered logic processing has occurred, in accordance with embodiments of the present disclosure. In method 1300, data that is to be transmitted can be input into an application layer, e.g., data that has been "splintered" off of a packet by method 800 of FIG. 8, as described at 1302. The data can then be processed in the application layer, as described at 1304. The data can be transferred to a transport layer, as described at 1306, for processing, as described at 1308.

Continuing with the description of method 1300, the data can be transferred to an internet protocol ("IP") layer, as described at 1310, for processing in the IP layer, as described at 1312. The data can be transferred to a data link, as described at 1314, and processed in the data link, as described at 1316. The data can then be transferred to a physical layer, as described at 1318, and processed in the physical layer, as described at 1320. The data can then be transferred to a network, as described at 1322.

Testing

The control logic, registers, decoding, and internal selects for each device have been shown in the previous figure by a single box "ctrl logic." During the proof of concept testing, the present inventor(s) used in-house library of control functions and derived an approximate amount of logic (Verilog equations) for this unit. Off-the-shelf Verilog code was available for the Atlantic Interface and control logic. Using the Altera Quartus II FPGA tools, the present inventor(s) synthesized and fit the logic into an Altera GX130 FPGA, consuming only 12-20% of FPGA on-chip resources.

For completed testing. Verilog coding and test bench simulation towards functions with either critical logic or potential bottlenecks, in order to prove that the data path was feasible to support rates of n×10 Gbps. Modelsim was used to simulate the data flow between packet fifo, demux logic, listed packet buffer, and buffer to DMA. The results of the simulation were that data flow was functional as given in the previous diagrams, and we verified that there were no bandwidth bottlenecks: our system design was proven to be feasible.

Accordingly, embodiments of the present disclosure can provide various advantages over the prior art; such advantages can include the ability to increase file transfer rates over networks and/or provide file transfer functionality with reduced cost. As faster versions of the busses become available, e.g., PCI express bus, embodiments of the present disclosure can provide splintered TCP and UDP operation at higher rates, e.g., 128 Gbps to 1,000+ Gbps f-d for Terabit Ethernet applications.

While certain embodiments have been described herein, it will be understood by one skilled in the art that the methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A method of network acceleration comprising:
instructing an application to send descriptor contents to an operating system;
instructing the operating system to perform a non-blocking socket read from the application;
instructing the operating system to attempt to pin a page in host memory;
in response to a successful passing of the page pinning, instructing the operating system to process the descriptor;
instructing the operating system to put the descriptor into its descriptor table;
instructing the operating system to send via dynamic memory access (DMA) the processed descriptor to a network interface device descriptor table;
instructing that a received (RX) packet is input to a network interface device physical layer;
instructing that the packet is processed in the network interface device physical layer;

instructing that the packet is transferred from the network interface device physical layer to a network interface device data link layer;
instructing that the packet is processed in the network interface device data link layer;
instructing that a query is made to see if the packet is listed in the descriptor table;
in response to the packet being listed in the descriptor table, transferring the packet to splintering logic;
in response to an unsuccessful passing of the page pinning, instructing the operating system to process all headers in a headers-to-be-processed ring;
instructing the application to negotiate for memory; and
instructing the application to perform de-queuing and receive a system call.

2. The method of claim 1, further comprising:
instructing the operating system to remove the packet descriptor from the operating system descriptor table;
instructing the operating system to re-queue the packet descriptor onto the network interface device with a flag set; and
updating the network interface device hardware descriptor table so that the network interface device removes the descriptor from the network interface device descriptor table.

3. The method of claim 1, wherein the network interface device comprises a network interface card (NIC) circuit.

4. The method of claim 3, wherein the NIC circuit is configured and arranged to have a bandwidth of about 5 Gbps to about 1,000 Gbps.

5. The method of claim 4, wherein the NIC circuit is configured and arranged to have a bandwidth of about 10 Gbps.

6. The method of claim 1, further comprising updating a descriptor table in the network interface device.

7. A method of processing a packet with splintering logic, the method comprising:
providing a network interface circuit with a packet having a packet header descriptor and packet data;
transferring packet data to a storage location in an application layer linked to the network interface circuit, wherein the storage location is a receive buffer utilized by the application layer to receive data;
transferring a packet header to an operating system linked to the network interface circuit and the application layer, and wherein use of a transmission control protocol/internet protocol (TCP/IP) stack or a UDP/IP stack is avoided for the transferring of the packet header;
providing instructions to an application to send descriptor contents to the operating system;
providing instructions to the operating system to perform a non-blocking socket read from the application;
providing instructions to the operating system to attempt to pin a page in host memory;
in response to a successful passing of the page pinning, providing instructions to the operating system to process the descriptor;
providing instructions to the operating system to put the descriptor into its descriptor table;
providing instructions to the operating system to send via dynamic memory access (DMA) the processed descriptor to a network interface device descriptor table;
providing instructions that a received (RX) packet is input to a network interface device physical layer;
providing instructions to the network interface device physical layer for processing the packet;
providing instructions to the network interface device physical layer for transferring the packet from the network interface device physical layer to a network interface device data link layer;
providing instructions to the network interface device data link layer to process the packet;
providing instructions to make a query to see if the packet is listed in the descriptor table;
in response to the packet being listed in the descriptor table, transferring the packet to splintering logic;
in response to an unsuccessful passing of the page pinning, providing instructions to the operating system to process all headers in a headers-to-be-processed ring;
providing instructions to the application to negotiate for memory; and
providing instructions to the application to perform de-queuing and receive a system call.

8. The method of claim 7, wherein the packet is a transmission control protocol (TCP) packet.

9. The method of claim 7, wherein the packet is a user datagram protocol (UDP) packet.

10. The method of claim 7, wherein the packet is an internet protocol (IP) packet.

11. The method of claim 7, wherein the network interface circuit comprises a network interface card (NIC) circuit.

12. The method of claim 11, wherein the NIC circuit is configured and arranged to have a bandwidth of about 5 Gbps to about 1,000 Gbps.

13. The method of claim 12, wherein the NIC circuit is configured and arranged to have a bandwidth of about 10 Gbps.

14. The method of claim 7, further comprising updating a descriptor table in the network interface circuit.

15. A computer-executable program product comprising a computer-readable non-transitory storage medium with resident computer-readable instructions, the computer readable instructions comprising:
instructions for providing a network interface device with a packet having a packet header and packet data;
instructions for transferring packet data to a buffer in an application layer linked to the network interface device;
instructions for transferring a packet header to an operating system (OS) linked to the network interface device and the application layer, wherein use of a TCP/IP stack or a UDP/IP stack is avoided for the transferring of the packet header;
instructions for an application to send descriptor contents to the operating system;
instructions for the operating system to perform a non-blocking socket read from the application;
instructions for the operating system to attempt to pin a page in host memory;
instructions for, in response to a successful passing of the page pinning, the operating system to process the descriptor;
instructions for the operating system to put the descriptor into its descriptor table;
instructions for the operating system to send via dynamic memory access (DMA) the processed descriptor to a network interface device descriptor table;
instructions that a received (RX) packet is input to a network interface device physical layer;
instructions that the packet is processed in the network interface device physical layer;
instructions that the packet is transferred from the network interface device physical layer to a network interface device data link layer;

instructions that the packet is processed in the network interface device data link layer;
instructions that a query is made to see if the packet is listed in the descriptor table;
instructions for, in response to the packet being listed in the descriptor table, transferring the packet to splintering logic;
instruction for, in response to an unsuccessful passing of the page pinning, the operating system to process all headers in a headers-to-be-processed ring;
instructions for the application to negotiate for memory; and
instructions for the application to perform de-queuing and receive a system call.

16. The program product of claim 15, wherein the packet is a transmission control protocol (TCP) packet.

17. The program product of claim 15, wherein the packet is a user datagram protocol (UDP) packet.

18. The program product of claim 15, wherein the packet is an internet protocol (IP) packet.

19. The program product of claim 15, further comprising instructions for processing packet headers upon the occurrence of an OS interrupt.

20. The program product of claim 15, wherein the network interface device comprises a network interface card (NIC) circuit.

21. The program product of claim 20, wherein the NIC circuit is configured and arranged to have a bandwidth of about 5 Gbps to about 1,000 Gbps.

22. The program product of claim 21, wherein the NIC circuit is configured and arranged to have a bandwidth of about 10 Gbps.

23. The program product of claim 15, further comprising updating a descriptor table in the network interface device.

24. A splintered packet offload engine system comprising:
a network interface device configured to interface with (i) a network, (ii) an operating system, and (iii) an application, wherein the network interface device includes a descriptor table, the operating system is linked with host memory and configured to perform a page pinning to the memory, the application includes a receive buffer, and the network interface device comprises splinter offload logic, wherein the splinter offload logic is configured to avoid use of a TCP/IP stack or a UDP/IP stack for processing headers;
wherein the splintered packet offload engine system is configured to:
instruct the application to send descriptor contents to the operating system;
instruct the operating system to perform a non-blocking socket read from the application;
instruct the operating system to attempt to pin a page in host memory;
in response to a successful passing of the page pinning, instruct the operating system to process the descriptor;
instruct the operating system to put the descriptor into its descriptor table;
instruct the operating system to send via dynamic memory access (DMA) the processed descriptor to a network interface device descriptor table;
instruct that a received (RX) packet is input to a network interface device physical layer;
instruct that the packet is processed in the network interface device physical layer;
instruct that the packet is transferred from the network interface device physical layer to a network interface device data link layer;
instruct that the packet is processed in the network interface device data link layer;
instruct that a query is made to see if the packet is listed in the descriptor table;
in response to the packet being listed in the descriptor table, transfer the packet to splintering logic;
in response to an unsuccessful passing of the page pinning, instruct the operating system to process all headers in a headers-to-be-processed ring;
instruct the application to negotiate for memory; and
instruct the application to perform de-queuing and receive a system call.

25. The system of claim 24, further comprising a software application.

26. The system of claim 24, further comprising a media access controller for Ethernet.

27. The system of claim 24, further comprising a backplane interface.

28. The system of claim 24, wherein the splinter offload logic is configured and arranged in a field programmable gate array (FPGA).

29. The system of claim 24, wherein the splinter offload logic is configured and arranged in an application specific integrated circuit (ASIC).

30. The system of claim 24, wherein the splinter offload logic is configured and arranged in a hardware description or behavioral language.

31. The system of claim 30, wherein the language is C, Verilog, or VHSIC hardware description language (VHDL), wherein VHSIC refers to very-high-speed integrated circuits.

32. The system of claim 24, wherein the splinter offload logic is configured and arranged in a circuit board.

33. The system of claim 24, wherein the network interface device is configured and arranged to have a bandwidth of about 5 Gbps to about 1,000 Gbps.

34. The system of claim 33, wherein the network interface device is configured and arranged to have a bandwidth of about 10 Gbps.

35. The system of claim 24, wherein the network interface device is configured and arranged to receive a user datagram protocol (UDP) packet.

36. The system of claim 24, wherein the network interface device is configured and arranged to receive a UDP-based data transfer protocol (UDT) packet.

37. The system of claim 24, wherein the network interface device is configured and arranged to receive an internet protocol (IP) packet.

38. The system of claim 24, wherein the network interface device is configured and arranged to receive a transmission control protocol (TCP) packet.

* * * * *